United States Patent
Kamath Koteshwara et al.

(10) Patent No.: US 9,424,456 B1
(45) Date of Patent: Aug. 23, 2016

(54) ULTRASONIC FINGERPRINT AUTHENTICATION BASED ON BEAM FORMING

(71) Applicant: Amazon Technologies, Inc., Seattle, WA (US)

(72) Inventors: Krishna Kamath Koteshwara, San Jose, CA (US); Pushkaraksha Gejji, Cupertino, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/748,480

(22) Filed: Jun. 24, 2015

(51) Int. Cl.
G06K 9/00 (2006.01)
(52) U.S. Cl.
CPC .............. *G06K 9/0002* (2013.01); *G06K 9/001* (2013.01); *G06K 9/00093* (2013.01)
(58) Field of Classification Search
None
See application file for complete search history.

(56) References Cited

U.S. PATENT DOCUMENTS

| | | | |
|---|---|---|---|
| 8,601,876 B2 | 12/2013 | Schneider et al. | |
| 2008/0258580 A1 | 10/2008 | Schneider et al. | |
| 2010/0251824 A1 | 10/2010 | Schneider et al. | |
| 2012/0030752 A1 | 2/2012 | Bruno et al. | |
| 2012/0177257 A1 * | 7/2012 | Maev | G06K 9/0002 382/124 |
| 2014/0219521 A1 | 8/2014 | Schmitt et al. | |
| 2015/0082890 A1 | 3/2015 | Pant et al. | |

FOREIGN PATENT DOCUMENTS

CN 101502424 A 8/2009

OTHER PUBLICATIONS

Anthony. Qualcomm Unveils its Answer to Touch ID: Ultrasonic Fingerprint Scanning. ARS Technica. Gears & Gadgets—Product News & Reviews. Mar. 2, 2015. http://arstechnica.com/gadgets/2015/03/qualcomm-unveils-its-answer-to-touch-id-ultrasonic-fingerprint-scanning/. Downloaded Apr. 21, 2015.
Dolcourt. Listen Up! Qualcomm's Ultrasonic 3D Fingerprint Scanner Could One Day Give Passwords the Finger (Hands-On). CNET. Security. Mar. 2, 2015. http://www.cnet.com/news/qualcomm-snapdragon-sense-id-3d-fingerprint-scanner-hands-on/.
Mialtoni. Fingerprint Recognition—Sensing, Feature Extraction and Matching. Summer School for Advanced Studies on Biometrics: Authentication and Recognition. University of Bologna, Italy. Jun. 2003. http://perso.telecom-paristech.fr/~chollet/Biblio/Cours/Biomet/fribourg/maltoni_1.pdf. Downloaded on Apr. 21, 2015.
Mazumdar, et al. Biometric Security Using Finger Print Recognition. University of California, San Diego, 2008.
Moore. Ultrasound Beamformation and Image Reconstruction. AAPM Conference, 2009.

(Continued)

*Primary Examiner* — Chan Park
*Assistant Examiner* — Elisa Rice
(74) *Attorney, Agent, or Firm* — Seyfarth Shaw LLP; Ilan N. Barzilay

(57) ABSTRACT

An ultrasonic finger print authentication system that generates a three-dimensional representation of a fingerprint. High frequency sound waves are used as a medium for imaging finer details of the patterns on a fingertip, including the ridge and valley formations. Multiple frequencies and beam-forming are used to quickly map the ridges. Acoustic resonance is used to determine the depths of the intervening valleys.

20 Claims, 12 Drawing Sheets

(56) References Cited

OTHER PUBLICATIONS

Sonavation, Inc. Sonavation Ultrasound Biometric Sensor. http://www.sonavation.com/ultrasound-biometric-sensor/. Downloaded on Dec. 22, 2015.
Sonavation, Inc. Sonavation Ultrasound Biometric Technology. http://www.sonavation.com/sonavation-ultrasound-biometric-technology/. Downloaded on Dec. 22, 2015.
Sonavation, Inc. Sonavation Touch Sensor Under Glass Technology. http://www.sonavation.com/touch-under-glass/. Downloaded on Dec. 22, 2015.
Sonavation, Inc. Sonavation Intellectual Property Portfolio. http://www.sonavation.com/intellectual-property-portfolio/. Downloaded on Dec. 22, 2015.
STMicroelectronics. Securing the Information Age. TCSIAD TouchChip Fingerprint Sensor Product Specification, 2001.
Vancamp. Ultrasound Fingerprint Scanners Could Unlock the Future of Unlocking. Digital Trends. Mobile News. http://www.digitaltrends.com/mobile/sonavation-ultrasound-fingerprint-sensor-in-depth/. Feb. 26, 2014.
Xia. Innovations in Fingerprint Capture Devices. Pattern Recognition 36, No. 2, pp. 361-369, 2003.

* cited by examiner

ULTRASONIC FINGERPRINT AUTHENTICATION BASED ON BEAM FORMING

BACKGROUND

Personal mobile computing devices with touch-screen user interfaces have become ubiquitous. These devices are often loaded with private and sensitive information, such as personal e-mail and contact lists. As a security measure to protect this information, mobile computing devices may be configured to require a passcode or password identification number (PIN).

BRIEF DESCRIPTION OF DRAWINGS

For a more complete understanding of the present disclosure, reference is now made to the following description taken in conjunction with the accompanying drawings.

Figure 1:
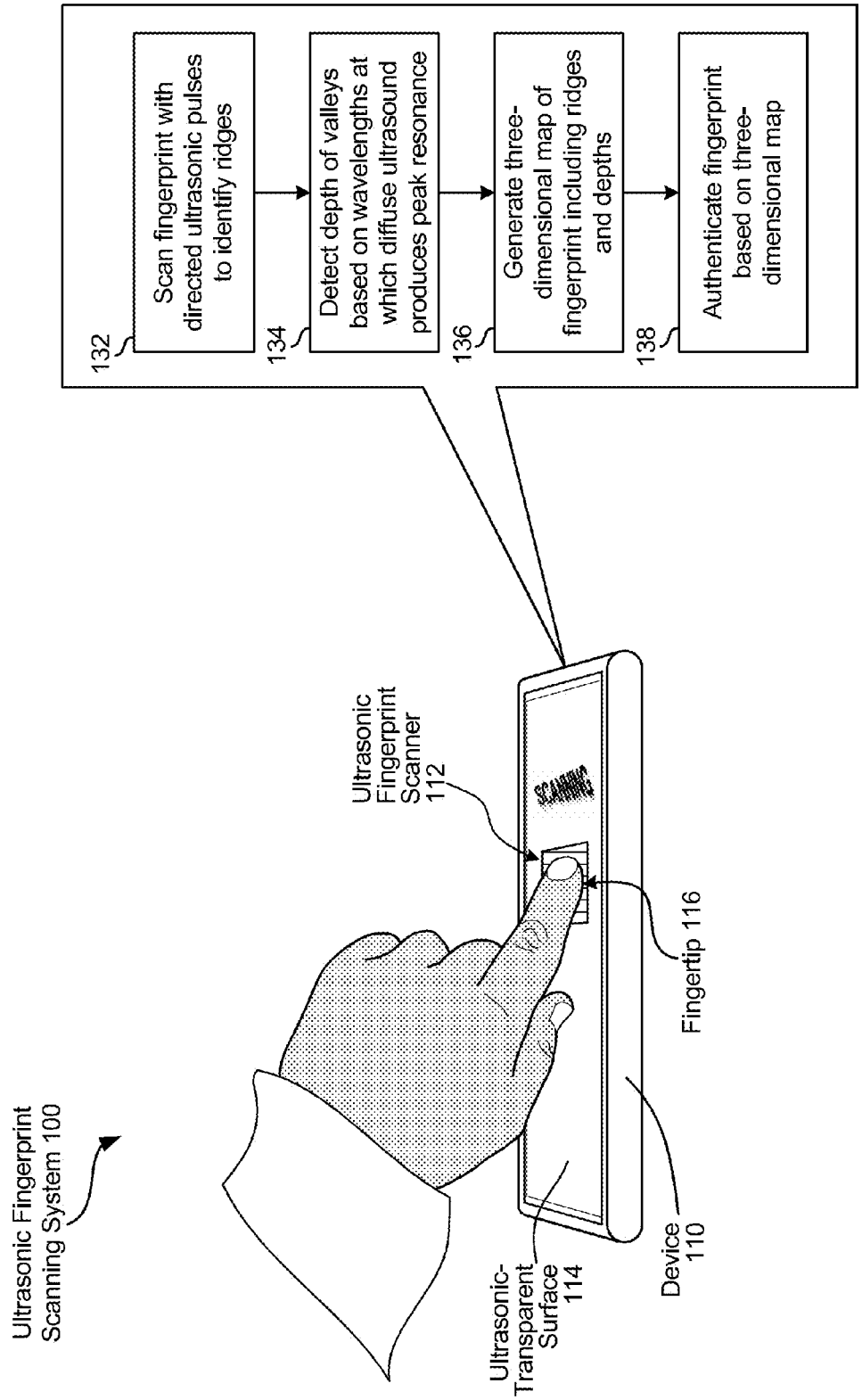
FIG. 1 illustrates a system for scanning a fingerprint in three-dimensions using ultrasound.

Unless stated otherwise, the figures are not drawn to scale and the relative sizes of features are not proportional.

DETAILED DESCRIPTION

Information related to a person's identity, financial information, and/or credit cards can be easily compromised. Such information may be secured by using periodic or non-periodic re-authentication to relate a specific user to his or her credit card or identification device. For example, a challenge and response method may be used to require regular re-authentication, requiring a PIN code, a password, a fingerprint, a voiceprint, and/or other biometric feature. The biometric feature(s) may be biometric data corresponding to a physical characteristic of the user that may differentiate the user from other users. Biometric features/data may include, for example a voice print, a fingerprint, a facial image, a cardiac rhythm, retinal scan, etc. Biometric authentication may be used for a wide variety of transactions, such as to allow authorization of a payment transaction including credit card transactions, to allow entry into buildings, to provide identification for public transport including airports, and other situations in which a person may be required to authenticate himself/herself.

For fingerprint authentication, a fingerprint sensor is an electronic device used to capture a digital image of the fingerprint pattern. The captured image is called a "live scan." The live scan is digitally processed to create a biometric template (a collection of extracted features) which is stored and used for fingerprint matching and authentication. Biometric analysis of fingerprints for identification-matching purposes generally requires the comparison of several extracted features of a fingerprint with a stored template. The extracted features correspond to aggregate characteristics of ridges and minutia points. Minutia points are unique features of the ridges found within a fingerprint. Technologies are available for performing live scans include optical, ultrasonic, and capacitive.

Optical fingerprint imaging captures a digital image of a fingerprint using light. This type of sensor is, in essence, a specialized digital camera. The top layer of the sensor where the finger is placed is known as the "touch surface." Beneath this layer is a light-emitting phosphor layer which illuminates the surface of the finger. The light reflected from the finger passes through the phosphor layer to an array of solid state pixels (e.g., a charge-coupled device) which captures a visual image of the fingerprint. A scratched or dirty touch surface can result in a bad image of the fingerprint. A disadvantage of this type of sensor is that the imaging capabilities are affected by the quality of the skin on the finger. For instance, a dirty or marked finger may be difficult to image properly. Also, the outer layer of skin on the fingertips may erode to the point where a distinctive fingerprint is no longer visible. An optical fingerprint imager can also be easily fooled by an image of a fingerprint if not coupled with a "live finger" detector.

Ultrasonic fingerprint imaging sensors use principles similar to those of medical ultrasonography in order to create visual images of the ridges and minutia points of a fingerprint. Unlike optical imaging, ultrasonic sensors use very high frequency sound waves to penetrate the epidermal layer of skin. The sound waves may be generated using piezoelectric transducers and the reflected energy may also be measured using piezoelectric materials. Since the dermal skin layer underlying the outer layer of skin exhibits the same characteristic pattern of the fingerprint, the reflected wave measurements can be used to form an image of the fingerprint. This eliminates the need for clean, undamaged epidermal skin and a clean sensing surface.

Capacitance-based fingerprint sensors form an image of a fingerprint by measuring the capacitances between the sensor and the dermal layer underlying the outer layer of skin. In essence, each sensor forms one plate of a "parallel plate" capacitor and the electrically conductive dermal layer forms the other plate. The intervening non-conductive epidermal layer acts as a dielectric. Capacitive fingerprint sensors may be passive or active.

A passive capacitance sensor array forms an image of the fingerprint patterns on the dermal layer of skin. Each sensor pixel is used to measure the capacitance at that point of the array. The capacitance varies between the ridges and valleys of the fingerprint due to the fact that the volume between the dermal layer and sensing element in valleys contains an air gap. The dielectric constant of the epidermis and the area of the sensing element are known values. The measured capacitance values are then used to distinguish between fingerprint ridges and valleys.

Active capacitance sensor arrays use a charging cycle to apply a small voltage to the skin before measurement takes place. The resulting electric field between the finger and the sensor follows the pattern of the ridges in the dermal skin layer. On the discharge cycle, the voltage across the dermal layer and sensing element is compared against a reference voltage in order to calculate the capacitance. Distance values are calculated based on the calculated capacitances and used to form an image of the fingerprint. Active capacitance sensors measure the ridge patterns of the dermal layer similar to the ultrasonic method. This eliminates the need for clean, undamaged epidermal skin and a clean sensing surface.

An advantage of capacitive sensors over optical and ultrasonic sensors is that capacitive sensors can be used to provide a three-dimensional image of a fingertip, capturing information about the depths of the valleys between the ridges. In comparison, a two-dimensional live scan produces a result similar to a conventional ink-tray fingerprint. An advantage of three-dimensional imaging is that the depth of valleys between the ridges can be used to provide additional biometric-relevant data for the purpose of fingerprint-based authentication.

Unfortunately, while the three-dimensional images produced by capacitive image sensors enable more robust and accurate authentication, capacitive sensors have a number of disadvantages. One disadvantage is that they react to moisture on the skin surface (the "wet/dry finger" problem). While software can be used to correct for surface moisture if the fingertip is evenly moist, variation of moisture across the fingertip reduces the accuracy of the three-dimensional data, and may result in authentication failures. Another disadvantage is that unlike ultrasonic sensors, capacitive sensors need to be exposed through the housing of a device, requiring surface area to be dedicated for the capacitive sensor. Another disadvantage is that unlike optical and ultrasonic sensors, capacitive sensors are susceptible to electrostatic discharge damage, where the arc of a static-electric charge between a finger and the sensor may permanently damage the sensor.

From a device longevity and packaging-design perspective, ultrasonic fingerprint detection have numerous advantages for use for authentication on personal electronic devices. Ultrasonic sensors are not susceptible to dirt and oil accumulations, and are also not susceptible to static-electric discharge. Since the ultrasonic technique images a subsurface of the finger skin, identification may be performed even if thin gloves are worn when then the finger is scanned (particularly useful in medical settings). In addition, the sensor array may be placed behind a contiguous housing, such as a glass or plastic housing, so long as the housing is relatively transparent to the ultrasonic frequencies used for scanning. The ability to include the ultrasonic array as an internal component simplifies manufacturing, improves the mechanical strength and environmental integrity of the housing, and enables inclusion of a fingerprint sensor with little or no dedicated external surface area (e.g., placing the array behind a display's cover glass and potentially behind the display itself, depending in part upon display technology).

However, while ultrasonic techniques have been used to identify ridges and minutia of a fingerprint, the scanning techniques and thresholds used by existing techniques to identify ridges (i.e., classifying fingerprint features as ridge or not-ridge) provide no detail about the depths of the valleys between the ridges, limiting authentication to two-dimensional features. In addition, existing ultrasonic solutions require a relatively long time to accurately map the ridges of a fingertip.

FIG. 1 illustrates an ultrasonic fingerprint scanning system 100 that builds a three-dimensional (3D) image of a fingertip, identifying ridges in two dimensions and the depths of the valleys between the ridges in a third dimension. Measuring the depths of the valleys provides an additional biometric authentication factor, allowing the system to better distinguish between the fingerprints of two people that otherwise have similar ridge patterns and minutia points.

A device 110 includes an ultrasonic fingerprint scanner 112 that performs steps (132) to (138). The ultrasonic fingerprint scanner 112 scans (132) a fingertip 116 through an ultrasonic-transparent (or substantially transparent) surface 114. The scan uses directed beams of ultrasound that may be emitted as pulses to detect ridges. Different regions of the fingertip 116 are scanned at the same time with pulses of different wavelengths to speed-up the ridge identification process.

The ultrasonic fingerprint scanner 112 also detects (134) wavelengths at which diffuse ultrasound produces resonance in valleys to determine depth, where depth corresponds to a wavelength, a harmonic that is an integer multiple of the fundamental frequency of the wavelength harmonic of a wavelength (e.g., $\lambda/2$, $\lambda/4$), or multiple of a wavelength (e.g., $2\lambda$, $3\lambda$). By sweeping the fingertip 116 with ultrasound across a range of frequencies and detecting the intensity peaks in the reflected energy that correspond to resonance, the depth of features of the fingertip 116 may be determined.

A three-dimensional map of the fingertip is generated (136) by combining the two-dimensional ridge information with the depth information. Depending upon the resolution of the ultrasonic fingerprint scanner 112, the depth information by itself lack sufficient "contrast" and detail to identify ridges by itself. However, when depth information is overlaid on a two-dimensional map of ridge locations, resonance-derived depth provides a fairly accurate and consistent representation of the fingertip 116 in three dimensions. This three-dimensional map may then be used to authenticate (138) the fingerprint with improved discrimination and accuracy than is provided by a two-dimensional ridge map by itself.

Figure 2:
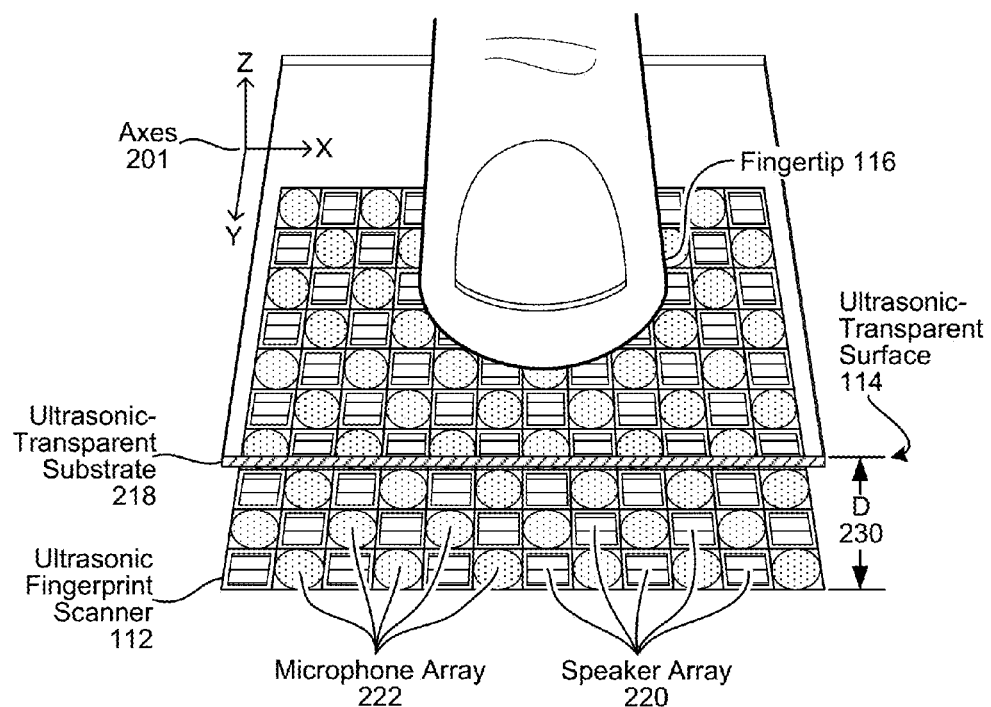
FIG. 2 illustrates an example of structural features of the fingerprint scanner of the system in FIG. 1.

FIG. 2 illustrates an example of structural features of the fingerprint scanner 112 of the system 100 in FIG. 1. The scanner 112 comprises an array of ultrasonic microphones 222 arranged in a plane in two dimensions (e.g., a plane formed by the X axis and Y axis of axes 201). Interspersed among the microphones 222 is an array of ultrasonic speakers 220. As illustrated for the purpose of explanation, the microphones are illustrated as circles and the speakers are illustrated as squares. Both the speaker array 220 and the microphone array 222 may comprise piezoelectric elements, with each element having dimensions on the order of tenths of millimeters (e.g., X-Y planar cross-sections of around 0.1 mm to 0.3 mm). Among other patterns, the microphones and speakers may be arranged in rows and columns, of which the illustrated alternating checker-board pattern is an example. As illustrated, the size and scale of the speaker in speaker array 220 and microphones in the microphone array 222 are much larger relative to size of fingertip 116 than would be the case in an actual device.

An ultrasonic-transparent (or substantially transparent) substrate 218 is positioned over the speaker array 220 and the microphone array 222. A user places their fingertip on the surface 114 of the substrate 218 for ultrasonic mapping. The surface 114 is separated from the plane of the arrays by a separation distance D 230. Scanning a two-dimensional ridge pattern, the distance D 230 may be based entirely on the minimum distance needed to focus a beam of ultrasound for scanning, which depends in part upon the pitch of the speakers and the size of the features being scanned. As the average width of a human male's fingerprint ridges is 0.48 mm, the distance between the arrays and the fingertip may consist entirely upon the thickness of the substrate 218 (e.g., a glass or plastic display).

However, to measure the depth of valleys in the "Z" axis, direction, the distance D 230 must be sufficiently large to facilitate resonance. The average height difference between a trough of a valley and crest of a ridge of a human male's fingerprint is 1.2 mm relative. From a resolution point of view, it is advantageous to be able to discern difference in depths of around 0.1 mm to 0.3 mm, distinguishing ridges from valleys based on a difference in depth corresponding to the smallest discernable resolution.

Using commercially available piezoelectric transducers for the arrays 220/222 that can transmit and receive across a frequency range from around 100 kHz up to around 572 kHz, the depths of such valleys can be determined with good resolution using half-wavelength harmonic and quarter-wavelength harmonic resonance, with a spacing distance D 230 on an order of 1.2 mm to 2 mm. Using transducers capable of higher frequencies, or detecting resonance at higher-order harmonics, the spacing distance D 230 may be further reduced.

Figure 3A:
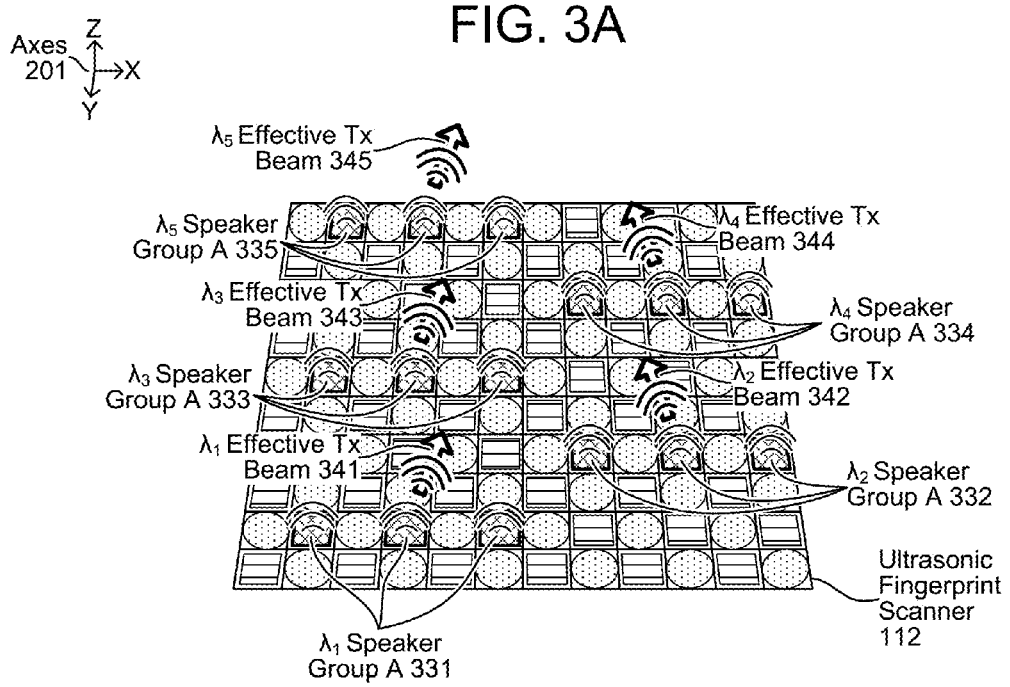
FIGS. 3A and 3B illustrate the fingerprint scanner engaging in directed ultrasound transmission and reception to determine locations of fingerprint ridges.
Figure 3B:
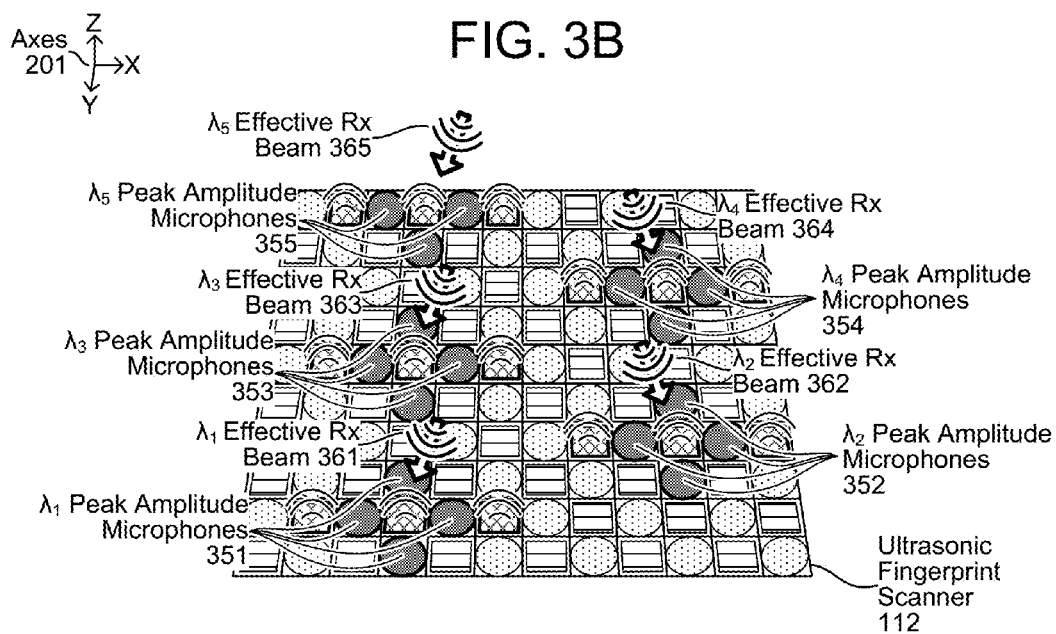

FIGS. 3A and 3B illustrate the fingerprint scanner engaging in directed ultrasound transmission and reception to determine locations of fingerprint ridges. To increase the speed with which the ridges can be resolved, the system 100 scans for the ridges of the fingerprint simultaneously using multiple ultrasonic frequencies. As illustrated, five different ultrasound frequencies are used at a same time, speeding up the ridge-mapping process in comparison to single-frequency ultrasonic scanning system.

The ultrasonic frequencies are selected so that the frequencies used for scanning will not create inter-modulation harmonics with each other. This is particularly important between emitter groups 331, 332, 333, etc. that actively emit in close proximity to each other. Inter-modulation harmonics exhibit non-linearities. For example, consider ultrasound of 100 kHz and 150 kHz. The 100 kHz will exhibit harmonics around 200 kHz, 300 kHz, 400 kHz, etc. Likewise, the 150 kHz ultrasound will exhibit harmonics around 300 kHz, 450 kHz, etc. The inter-modulation non-linearities will produce frequency components such as 150 kHz+100 kHz (250 kHz), 150 kHz−100 kHz (50 kHz), 200 kHz+150 kHz (350 kHz), 200 kHz−150 kHz (50 kHz), 200 kHz+100 kHz+150 kHz (450 kHz), etc. Such non-linearities can be filtered out when reflections are processed, but preferably the increments between frequencies are selected so that so that both the harmonics and non-linearities produced do not correspond to a wavelength selected for scanning.

Preferably, all of the frequencies used for scanning are selected so that no frequency is a harmonic of another (e.g., no frequency should be an integer multiple of another). For example, the frequencies may be selected based on prime numbers, or by adding integer multiples of a frequency to a base frequency (e.g., adding multiples of 1 kHz to 100 kHz, resulting in a series of frequencies such as 100 kHz, 101 kHz, 102 kHz, etc). Any frequency-spacing scheme known in the art for avoiding inter-modulation harmonics may be used.

As illustrated in FIG. 3A, five frequencies are transmitted by speakers of the ultrasonic scanner 112. Different regions of the fingertip 116 are scanned using different groups of speakers (331-335), with each group emitting ultrasound at a different wavelength/frequency. In general, wavelength ("λ") and frequency may be interchangeably used to characterize the ultrasound, with wavelength being equal to the speed-of-sound divided by frequency.

To control the directionality of ultrasound transmitted by groups (331-335) of the speaker array 220, a beam former controls the phase and relative amplitude of the signal output by each speaker in a respective group in order to create a pattern of constructive and destructive interference in the resulting wave front (i.e., transmission beamforming). The result is that each group (331-335) transmits an effective beam of ultrasound (341-345) at its assigned frequency. As noted above, the effective transmission beams 341-345 may be transmitted as pulses, although continuous beams may also be used.

As illustrated in FIG. 3B, reflections of the effective transmission beams 341-345 are received by the microphone array 222 as effective reception beams 361-365. The microphone receiving peak amplitudes at each frequency are highlighted microphones 351-355. Reflected ultrasound received by the microphone array 222 is processed by spatial filtering (i.e., receiver beam forming). Spatial filtering is a signal processing technique used in sensor arrays for directional signal reception. The microphone array 222 serves as a phased array, with signal processing combining signals received by the different microphones to determine each reflected wavefront's pattern of constructive interference and destructive interference.

FIGS. 4A to 4D illustrate a partial cross-sections of the fingerprint scanner 112 directing ultrasound transmissions at different angles toward ridges 472 of a fingertip 116 in contact with the ultrasonic-transparent surface 114, and receiving reflections of those directed transmissions.

Figure 4A:
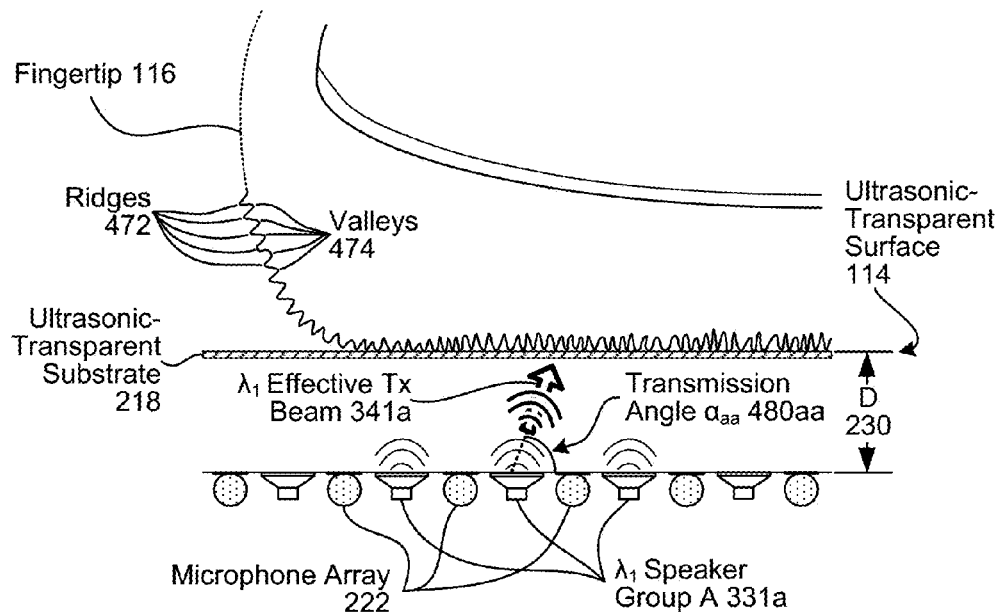
FIGS. 4A to 4D illustrate partial cross-sections of the fingerprint scanner directing ultrasound transmissions at different angles, and receiving reflections of those directed transmissions.

In FIG. 4A, a beamformer controls speaker group A 331 to transmit a first frequency/wavelength ($\lambda_1$) toward the fingertip 116, forming an effective transmission beam 341a at a transmission angle $\alpha_{aa}$ 480aa. The first "a" in the subscript refers to the speaker group, and the second "a" in the subscript refers to the direction. The strongest reflections of the beam 341a will be from the ridges 472, whereas ultrasound entering the valleys 474 between the ridges 472 is prone to scattering.

Figure 4B:
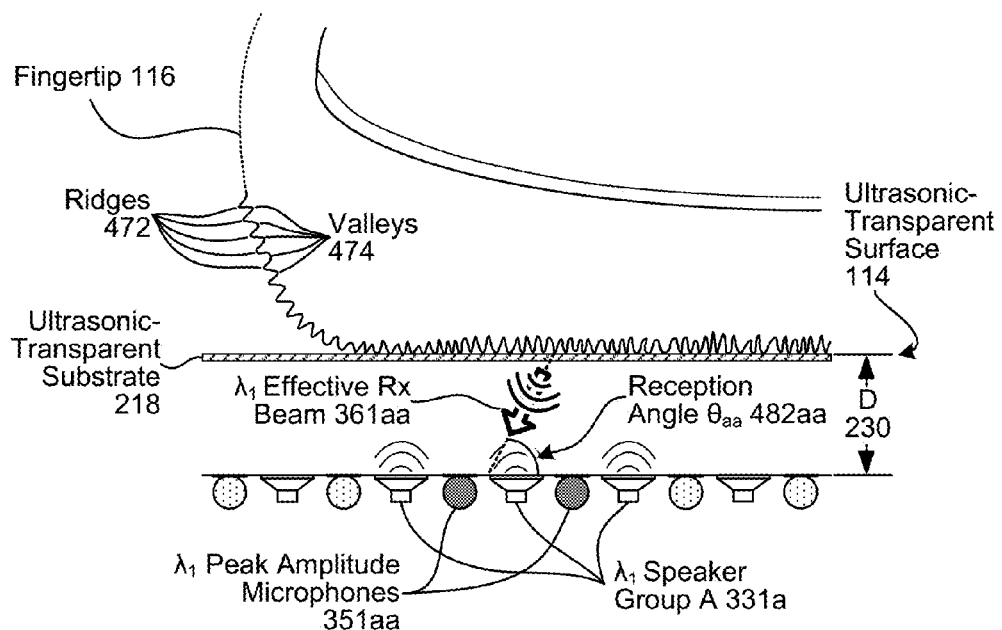

In FIG. 4B, the reflected wavefront, as received by the microphone array 222, forms an effective reception beam 361aa at a reception angle $\theta_{aa}$ 482aa. The peak amplitudes at the first frequency/wavelength ($\lambda_1$) are received by microphones 351aa. Other microphones of the array 222 may also receive the first frequency/wavelength ($\lambda_1$), but at less than the peak amplitude(s).

Figure 4C:
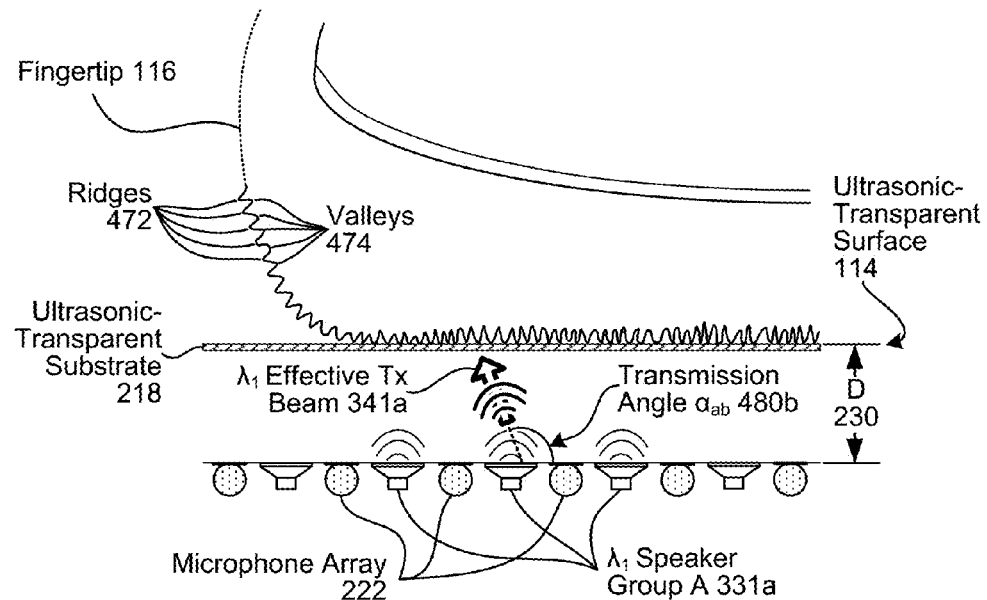
Figure 4D:
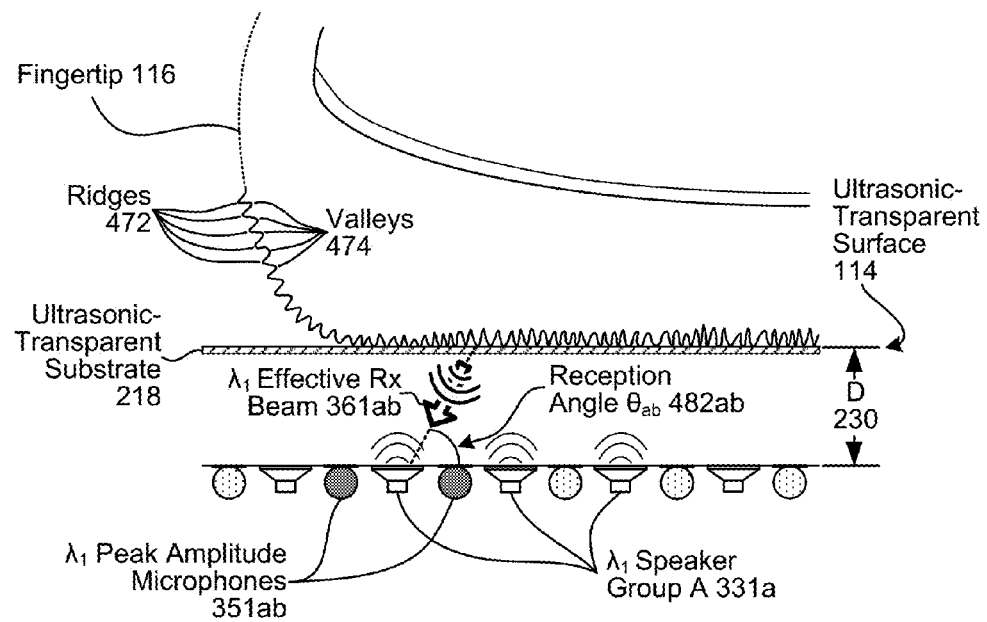

In FIG. 4C, the beam former controls speaker group A 331 to transmit the first frequency/wavelength ($\lambda_1$) toward the fingertip 116 at a different angle, forming an effective transmission beam 341a at a transmission angle $\alpha_{ab}$ 480ab. In FIG. 4D, the reflected wavefront, as received by the microphone array 222, forms an effective reception beam 361ab at a reception angle $\theta_{ab}$ 482ab. The peak amplitudes at the first frequency/wavelength ($\lambda_1$) are received by microphones 351ab. For the purpose of demonstration, although the peak microphones 351aa in FIG. 4B and the peak microphone 351ab in FIG. 4D might be the same, they may also be different (as illustrated).

Figure 5A:
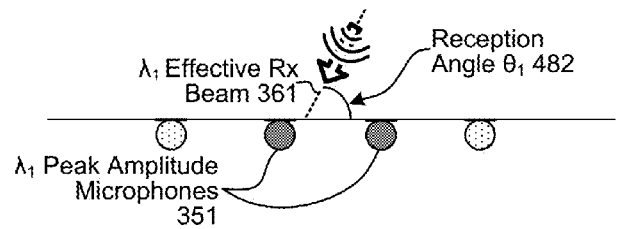
FIGS. 5A to 5C illustrate an example of spatial filtering (beam forming) to determine a direction of received ultrasound reflections and the location of ridges.
Figure 5B:
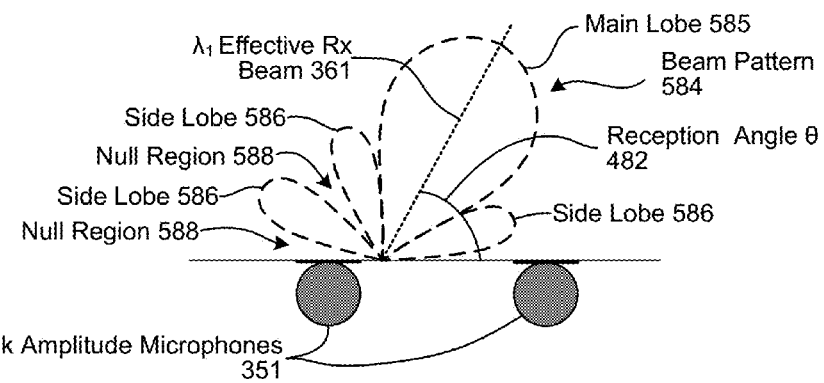

FIG. 5A illustrates a partial cross-section of a region of the microphone array 222 that includes microphone 351 receiving peak amplitudes at a wavelength λ. The reflected wavefront effectively forms a beam 361, received at an angle θ 482. FIG. 5B illustrates an example of spatial filtering (beam forming) used to determine a direction corresponding to the reception angle θ 482 of the received ultrasound reflections.

Beamforming is used to achieve spatial selectivity, determining the reception angle 482 and peak magnitude of the effective reception beam 361 for each transmitted frequency, based on the reflected wavefront at a respective frequency.

Spatial filtering sweeps the beam pattern 584 across a range of reception angles θ by applying beamforming coefficients to signal data acquired from a microphone array 222. The beam pattern 584 generates directions of effective gain or attenuation. As illustrated, the dashed line of the beam pattern 584 indicates isometric lines of gain provided by the beamforming coefficients. For example, the gain at the dashed line may be +12 decibels (dB) relative to an isotropic microphone.

The beam pattern 584 may exhibit a plurality of lobes, or regions of gain, with gain predominating in a particular direction. A main lobe 585 extends along the direction of the effective beam 361. In this example, the beam pattern 584 also includes side lobes 586. Disposed around the beam pattern 584 are null regions 588. These null regions are areas of attenuation to the received λ signals.

In the beamforming coefficients applied by the spatial filter to the signals from each microphone may be amplified by a different "weight." Different weighting patterns (e.g., based on a Dolph-Chebyshev window function) may be used to achieve the desired beam sensitivity pattern 585. The spatial filter sweeps the beam pattern 584 across the range of angles and determines the received signal magnitude at each angle. The angle θ corresponding to the peak magnitude is the reception angle θ 482 of the λ effective beam 361.

Figure 5C:
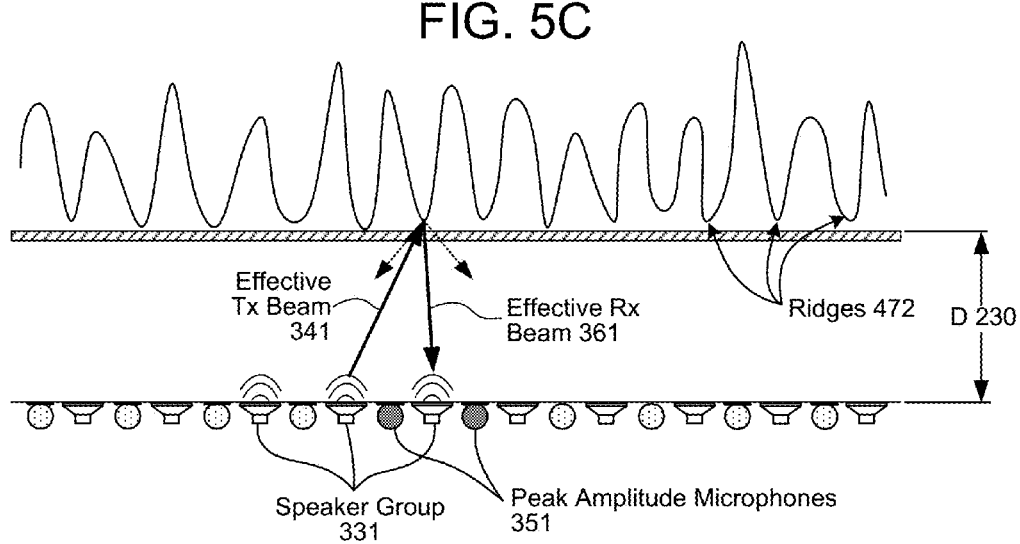

As illustrated in FIG. 5C, the reflection with the largest magnitude will correspond to the location of a ridge 472. Other reflections will have a less magnitude. The location of each ridge (in X-Y coordinates) at the surface 114 may be determined by geometry, using the X-Y coordinates where the effective reception beam 361 intersects the plane of the microphone array 222 (e.g., based on the locations of the peak amplitude microphones 351), the distance D 230, and the reception angle θ 482.

Figure 6A:
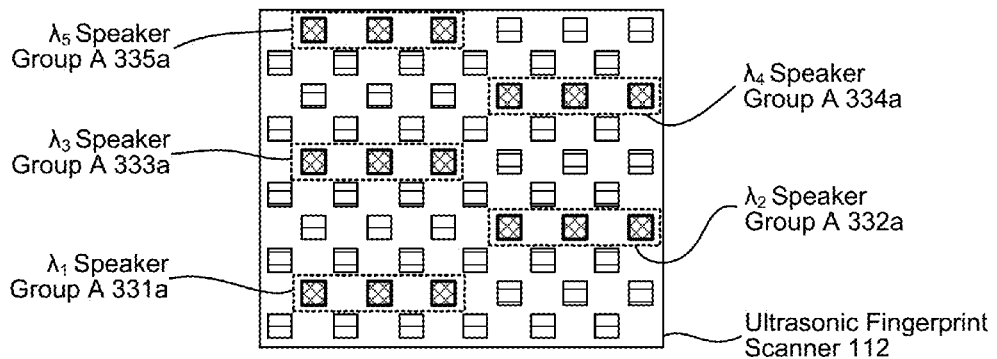
FIGS. 6A to 6C demonstrate an example of the fingerprint scanner iteratively scanning different regions of the fingerprint using ultrasound of different wavelengths.
Figure 6B:
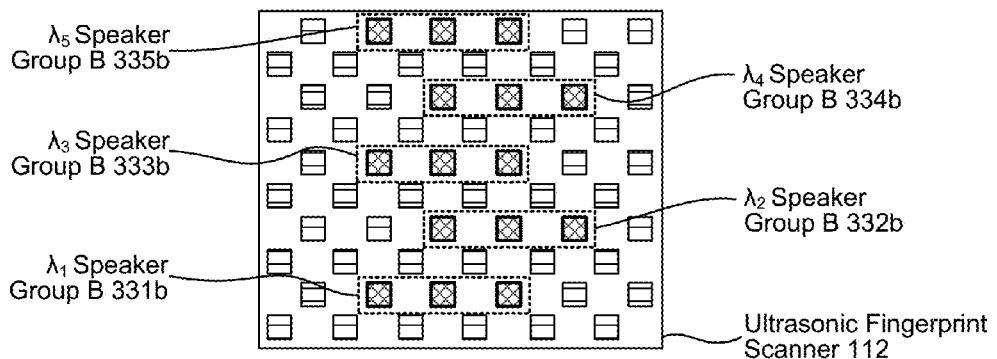
Figure 6C:
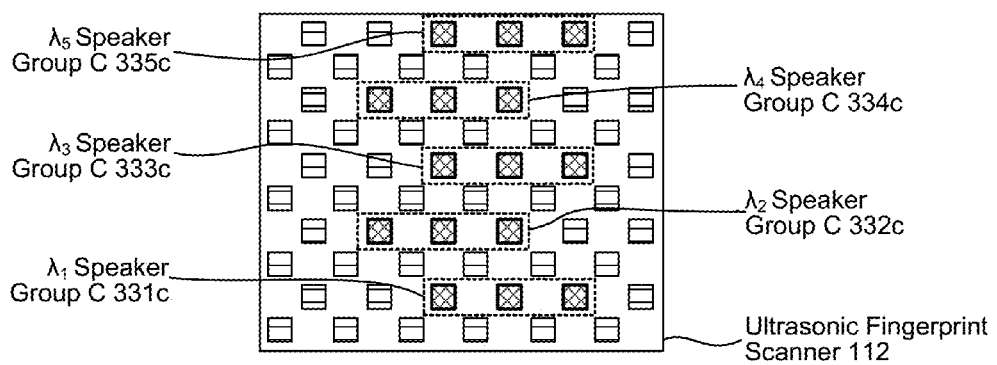

FIGS. 6A to 6C demonstrate an example of the fingerprint scanner iteratively scanning different regions of the fingertip 116 using ultrasound of different frequencies. As illustrated in FIG. 6A, groups of speakers (331a-335a) arranged in different rows are each assigned a unique frequency, and may scan their respective regions of the fingertip at a same time. There is a frequency offset to distinguish signals between rows. Once scanning of each region is complete, the groups each shift laterally by one speaker to form another group (331b-335b) and scan another region. The regions which are scan preferably overlap. After scanning those regions, the groups again shift laterally by one speaker to form another group (331c-335b) and scan another region. This process continues iteratively until the end of a row is reached, at which point a group may be formed in another row to scan additional regions.

As illustrated, the groups are initially arranged in every other row, and every other group shifts in an opposite direction. This separation between groups and direction of shifting is not required, but reduces the overall computational complexity of discriminating between frequencies when performing spatial filtering on the reflected beams (361-365) by having fewer frequencies received by individual microphones.

Depending upon proximity of the groups and the angles at which the ultrasound is reflected off the fingertip 116, microphones of the microphone array 222 may individually receive multiple frequencies. Also, although illustrated as using three speakers per group, a different number of speakers may be used, and a group may include adjacent speakers in more than one row. Also, although the difference between groups is illustrated as a shift by one speaker, larger shifts may be used. Also, after scanning by row, another pass may be performed by column to produce a more detailed mapping of the ridges 472, although in general, additional passes increase the time taken to map the ridges 472 while providing diminishing returns in terms of resolution. Also, although the transmission angles 480 produced by row-base groups are in a plane of formed by the row (i.e., a plane orthogonal to the array 220 and parallel to the row), if a speaker group comprises speakers in multiple rows and/or columns, then the direction of the effective transmission beam and corresponding transmission angle α may be rotated in all three dimensions.

Figure 7:
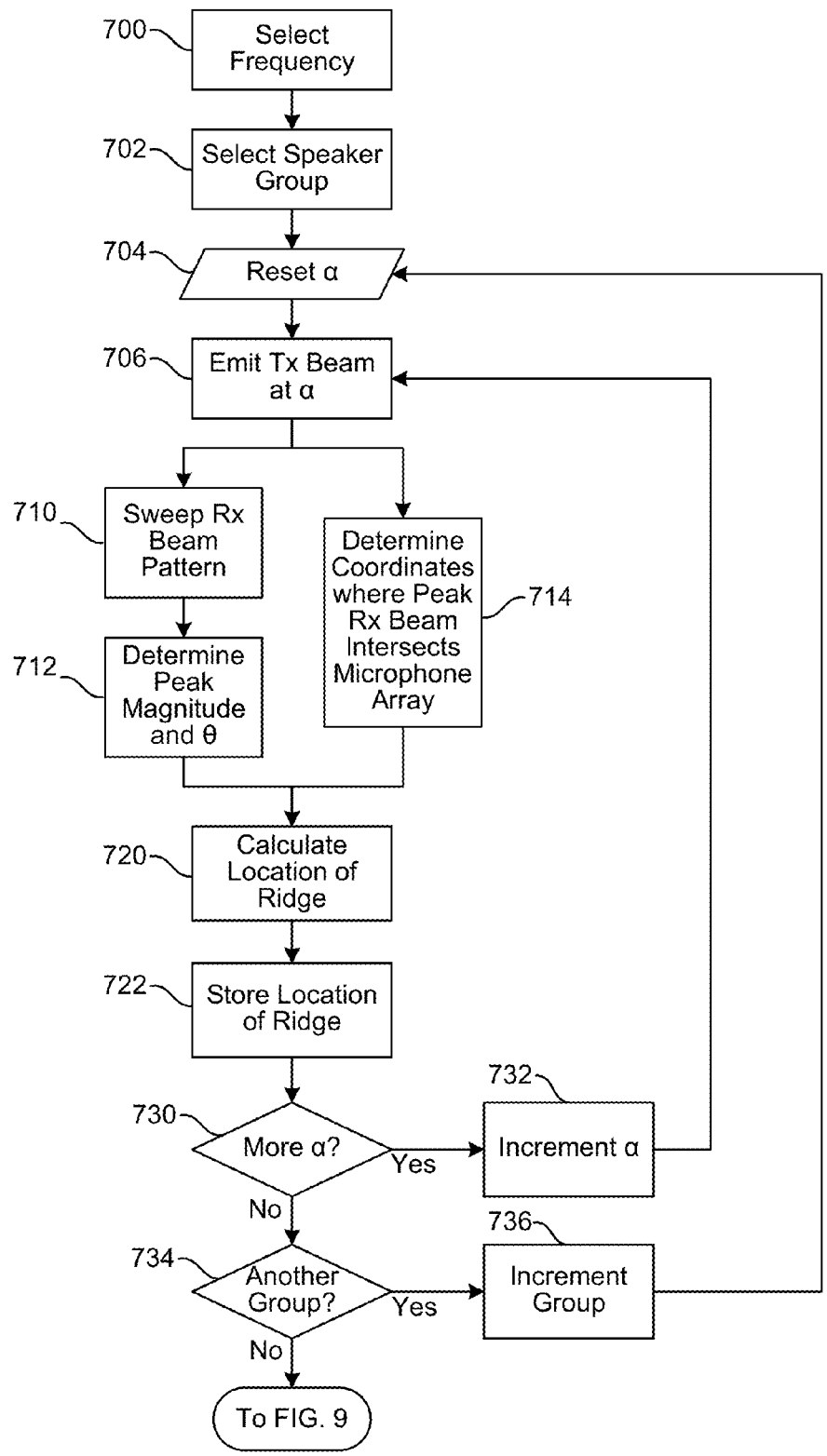
FIG. 7 is a flow diagram illustrating an example of a process for determining the locations of fingerprint ridges.

FIG. 7 is a flow diagram illustrating an example of a process for determining the locations of fingerprint ridges. The process in FIG. 7 is for one frequency, so the process would be repeated in parallel for each frequency, although the signal data from the microphone array 222 that includes the reflected ultrasound would be shared across parallel implementations of FIG. 7.

Initially, a frequency of ultrasound is selected (700) for the process. If multiple versions of the process are performed in overlapping time, each instance would select a different frequency. A group of speakers (e.g., 331-335) of the array of speakers 220 is selected (702) to scan a region for ridges 472. The transmission beam-former is reset to reset (704) the transmission angle α 480 to an initial setting. The beam-former is controlled to cause the selected speaker group to emit (706) an effective transmission beam (e.g., 341-345) at the transmission angle α 480.

Spatial filtering is applied to signal data from the microphone array 222 to sweep (710) a beam pattern (e.g., 584) across the received signals of the selected frequency. The direction of the beam pattern 584 that produces a largest amplitude magnitude of a reflection of the selected frequency determines (712) a reception angle θ 482, The largest amplitude magnitude determines the peak magnitude of the effective reception beam (e.g., 361-365). Coordinates relative to the microphone array 222 where microphones receive peak amplitudes (e.g., 351-355) are used to determine (714) where the effective reception beam intersects the microphone array 222. In general, the microphones receiving the peak amplitude for a particular frequency will be near the speakers that emitted (or are emitting) at that frequency. Also, although determining (712) the peak magnitude and reception angle θ 482 and determining (714) where the effective reception beam intersects the microphone array 222 are illustrated as parallel operations, they may instead be performed consecutively.

Applying geometry, a location of a ridge is calculated (720) based on the coordinates where the beam intersects the microphone array, the reception angle θ 482, and the distance D 230 between the microphone array and the fingertip 116. The location of the ridge is stored (722), with the collection of stored locations being used by a map generator to map the locations of the ridges in two dimensions.

The process then determines whether the scan of the region by the selected group of speakers has scanned at an entire range of the transmission angle α 480. If there are more angles to be scanned (730 "Yes"), the process increments (732) the transmission angle α 480, and the beam-former emits another beam (returning to 706). If the beam former has already scanned a full range of the transmission angles α 480 using the current group of speakers (730 "No"), the process determines whether there are speaker groups remaining to be used to scan the fingertip with the current selected frequency.

If there are additional groups (734 "Yes"), the group is incremented (e.g., as discussed in connection with FIGS. 6A-6C), the beam-former is reset to reset (704) the transmission angle α 480, the next group emits a transmission beam (706). Otherwise (734 "No"), the process ends, proceeding to the process in FIG. 9.

Figure 8:
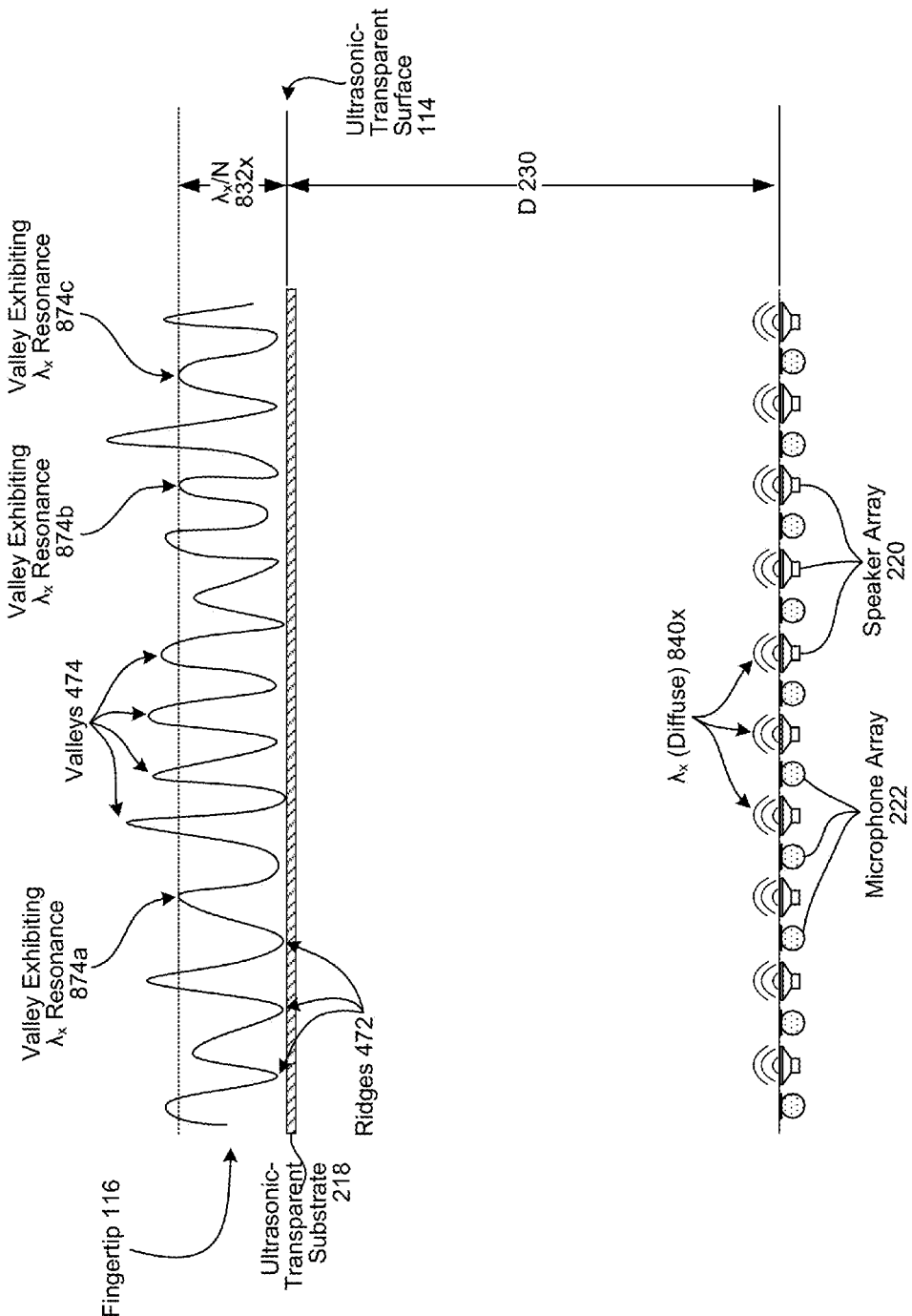
FIG. 8 illustrates an example of ultrasound resonance to determine the depth of several valleys.

FIG. 8 is a cross-section illustrating an example of ultrasound resonance to determine the depth of several valleys. Diffuse ultrasound 840x of a selected frequency "X" is emitted from the array of speakers 220. All of the speakers of the array may be simultaneously selected, or emissions may be limited to speakers aligned with the fingertip (based on the determined locations of the ridges). The selected frequency may be (for example) in a range from around 100 kHz up to around 572 kHz.

The reflected ultrasonic energy received by the microphone array 222 will exhibit resonance when the distance 832x between the surface 114 and the valleys 474 corresponds to the fundamental of the selected frequency and/or to a harmonic of the fundamental frequency. As illustrated, the valleys 874a, 874b, and 874c will exhibit resonance, as the distance between the trough of each valley and the array of speakers 220 is approximately equal to the wavelength $\lambda_x$/N (N=1, 2, 4, etc.) of the selected frequency "X." For example, the system 100 may be configured to produce resonance at $\lambda_x$/4 and $\lambda_x$/2 (depending upon the particular frequency of the diffuse ultrasound in the overall frequency range), with a distance D 230 between the arrays 220/222 and the surface 114 being greater than $\lambda_x$.

The depth of each valley determines whether there will be resonance. A ridge-to-ridge cross-section of the valleys 474 may be small relative to the wavelength $\lambda_x$, and resonance occurs as a simple standing wave within a valley (e.g., in 874a, 874b, and 874c). In essence, in terms of the standing waves, if the ridges forming a valley are flush with the surface 114, then the ultrasonic transparent surface 114 demarcates an end of each valley, such that the standing wave is between the base of the valley and the surface 114. However, if the ridges forming a valley are not flush with/bounded by the surface 114 (e.g., there is a gap between the ridges 472 and the surface 114), it is the distance from the top of the valley to the base of the valley that determines resonance of an individual valley.

The distance D 230 provides a medium for propagating the ultrasound, and should be selected so that it is not a multiple of any of the wavelengths $\lambda_x$, so that the distance between the between the fingertip 116 and the arrays 220/222 does not contribute to resonance. Conversely, the ultrasonic frequencies used to generate the diffuse ultrasound should be selected so that no multiples of the wavelengths $\lambda_x$ are equal to the distance D 230. Preferably, the distance D 230 is much larger than the longest $\lambda_x$ to be generated by the scanner 112 (e.g., at least an order of magnitude larger).

Figure 9:
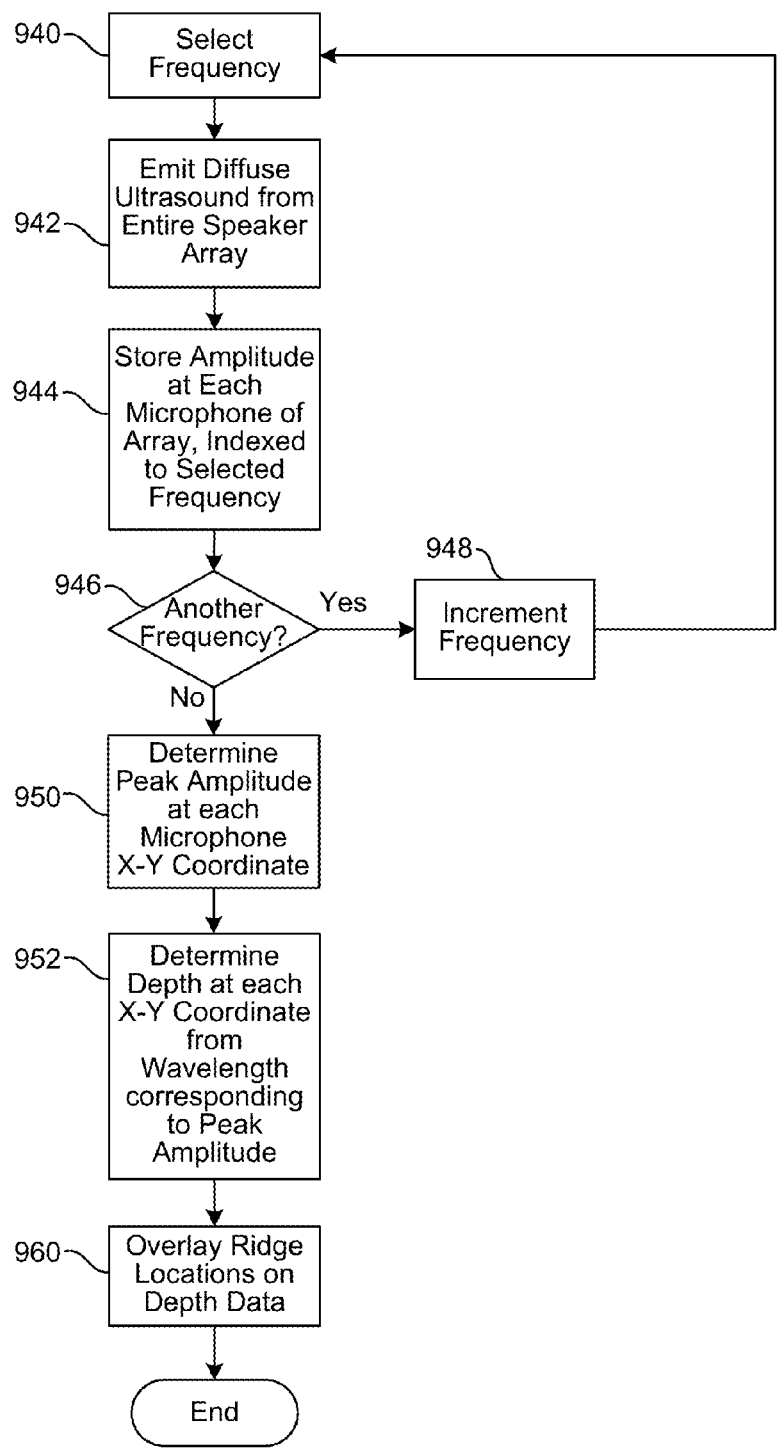
FIG. 9 is a flow diagram illustrating an example of a process for determining a depth of valleys between the fingerprint ridges.

FIG. 9 is a flow diagram illustrating an example of a process for determining a depth of valleys between the ridges. The process begins by selecting (940) a frequency (e.g., in a range of 100 kHz to 572 kHz). The entire speaker array 220 then emits (942) diffuse ultrasound at the selected frequency. The reflected ultrasound is received by the microphone array 222, and the amplitude data from each microphone is stored (944), indexed with indicia of the frequency/wavelength of the reflected ultrasound.

A determination is the made (946) as to whether there is another frequency in the range of frequencies (e.g., in a range of 100 kHz to 572 kHz) to be used. If there is (946 "Yes"), the frequency is incremented (948) and the process repeated (returning to 940). Otherwise (946 "No"), the stored data is sifted to determine (950) a peak amplitude at each microphone. A depth value is determined (952) for each peak amplitude, with the depth value corresponding to a fundamental wavelength $\lambda$ or a wavelength harmonic (e.g., $\lambda$/2, $\lambda$/4). Whether the fundamental wavelength or harmonic wavelength is used depends on the spacing distance D 230 between the arrays and the fingertip. Since the range of emitted wavelengths, distance D 230, and average depths of valleys 474 of the fingertip 116 are known, heuristics may be used to determine whether the depth should be calculated using the fundamental wavelength $\lambda$ or a wavelength harmonic (e.g., $\lambda$/2, $\lambda$/4).

A three-dimensional map is created by combining the X-Y coordinates of each microphone of the microphone array 222 with the depth determined for a respective microphone in the Z direction (referring to axes 201). The resulting map will ordinarily lack sharply defined edges, such that the resonance-based map will usually be inadequate to identify the location of the ridges and valleys with much precision. The degree of detail depends in part on the scale of the speaker and microphones, and the spacing there between. If viewed on its own, the three-dimensional map resonance-based coordinate data would resemble a "heat map." However, by overlaying (960) the two-dimensional ridge-location data from the process in FIG. 7 on the resonance-based coordinate data, a detailed three-dimensional with sharply defined features can be produced.

Matching algorithms are then used to compare previously stored templates of fingerprints against candidate fingerprints for authentication purposes. Either the original fingerprint map may be directly compared with the map of the candidate fingerprint, and/or certain features may be compared. Pattern-based algorithms compare the basic fingerprint patterns (arch, whorl, and loop) between a previously stored template and a candidate fingerprint. This requires that the map data to be aligned in the same orientation. To do this, an algorithm may be used to find a central point in the fingerprint map and center the map data based on that.

In a pattern-based algorithm, the template may contain the type, size, and orientation of patterns within the aligned fingerprint map. The candidate fingerprint map information is compared with the template to determine the degree to which they match, resulting in a calculated variance value that quantifies the degree of the match. The decision whether to not to authenticate the fingerprint is made by comparing the variance value with a threshold value.

Examples of pattern matching algorithms that may be used for authentication include time-warping and k-nearest neighbor. Computation of the variance value may be based on difference in "distances" between the template data and the current map data, such as using a modular approach such as a Manhattan algorithm or a Euclidean map (e.g., taking a square root of the sum of squares of distances between points). Other techniques of comparing three-dimensional fingerprint data with templates may be used, as known in the art of capacitive fingerprint sensors.

Figure 10:
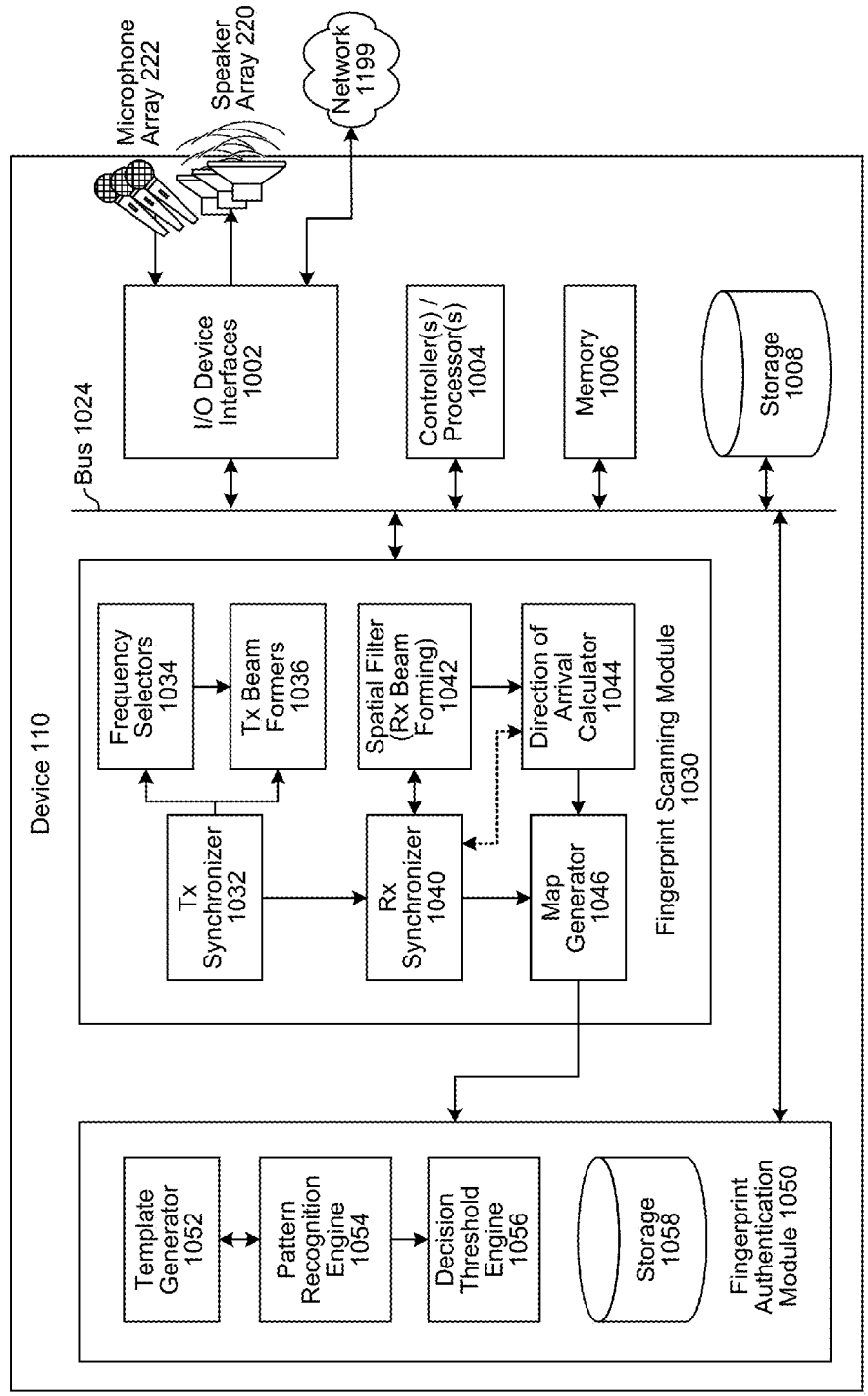
FIG. 10 is a block diagram conceptually illustrating example components of a device for authenticating based on three-dimensional scans of fingerprints.

FIG. 10 is a block diagram conceptually illustrating example components of a device 110 for authenticating based on three-dimensional scans of fingerprints. In operation, the system 100 may include computer-readable and computer-executable instructions that reside on the device 110, as will be discussed further below.

The device 110 includes the speaker array 220 and the microphone array 222, such as an array of piezoelectric elements including both the speakers and microphones. Although not illustrated in FIG. 10, the device 110 also includes the ultrasonic transparent substrate 218 (e.g., glass, plastic, etc. of a housing or display), where there is a distance D 230 between the arrays (220/222) and the outer surface 114 of the substrate 218.

The device 110 includes input/output device interfaces 1002. A variety of components may be connected through the input/output device interfaces 1002, such as the display (not illustrated), and the speaker array 220 and microphone array 222 of the fingerprint scanner 112. The input/output device interfaces 1002 may also include an interface for an external peripheral device connection such as universal serial bus (USB), FireWire, Thunderbolt or other connection protocol. The input/output device interfaces 1002 may also include a connection to one or more networks 1199 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 1199, the system 100 may be distributed across a networked environment, as will be discussed further below with FIG. 11.

The device 110 may include an address/data bus 1024 for conveying data among components of the device 110. Each component within the device 110 may also be directly connected to other components in addition to (or instead of) being connected to other components across the bus 1024.

The device 110 may include one or more controllers/processors 1004, that may each include a central processing unit (CPU) for processing data and computer-readable instructions, and a memory 1006 for storing data and instructions. The one or more controllers/processors 1004 may also include one or more digital signal processors (DSPs). The memory 1006 may include volatile random access memory (RAM), non-volatile read only memory (ROM), non-volatile magnetoresistive (MRAM) and/or other types of memory. The device 110 may also include a data storage component 1008, for storing data and controller/processor-executable instructions (e.g., instructions to perform the processes illustrated in FIGS. 1, 7, and 9). The data storage component 1008 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1002.

Computer instructions for operating the device 110 and its various components may be executed by the controller(s)/processor(s) 1004, using the memory 1006 as temporary "working" storage at runtime. The computer instructions may be stored in a non-transitory manner in non-volatile memory 1006, storage 1008, or an external device. Alternatively, some or all of the executable instructions may be embedded in hardware or firmware in addition to or instead of software.

The device 110 further includes a fingerprint scanning module 1030 that generates a three-dimensional map of a fingerprint using ultrasound, and a fingerprint authentication module 1050 that compares an input fingerprint with one or more stored templates. The fingerprint scanning module 1030 includes a transmission synchronizer 1032 that controls the timing of the processes with regard to emitting the ultrasonic signals. The transmission synchronizer 1032 may be implemented (among other ways) by the controller(s)/processor(s) 1004 as an executed program, as a state machine, or by programmable logic such as a field programmable gate array (FPGA). During the ridge-location data acquisition process (e.g., FIGS. 3A to 7), the transmission synchronizer controls the frequency selectors 1034 with set the frequencies output by the individual speakers of the array. The frequency selectors 1034 control the frequencies to be output by each of the transmission beam-formers 1036. The transmission synchronizer 1032 also controls the transmission beam formers 1036, which control the effective transmission beams (e.g., 341-345) output by each group of speakers (e.g., 331-335). The transmission beam formers may be, among other things executed instructions on the controller(s)/processor(s) 1004 and/or a field programmable gate array (FPGA). Selection of groups, speakers to be included in a group, transmission angle 480, etc., may be specified among other ways by a stored sequence, with the transmission synchronizer 1032 controlling the timing and execution of the sequence.

The transmission synchronizer 1032 also signals to a reception synchronizer 1040 when new pulses are transmitted or the transmission angles 480 change. The reception synchronizer 1040 may trigger collection of audio data from the microphone array 222, and processing of the audio data by the spatial filter 1042. The spatial filter 1042 sweeps through orientations of the reception beam pattern 584. The spatial filter 1042 applies beam-forming coefficients to the microphone data, outputting a signal magnitude and angle for a plurality of beam pattern orientations. The direction of arrival calculator 1044 receives the signal magnitude and angle data for each group, determines the peak amplitude magnitude occurring when the main lobe 585 is aligned with the effective reflection beam (e.g., 341-345) for each frequency. Based on the angle of the beam pattern 584 that produces the peak amplitude magnitude, the direction of arrival calculator 1044 outputs a reception angle $\theta$ 482 for each frequency. Each reception angle $\theta$ 482 is provided to the map generator 1046, together with the coordinates of where each wavefront producing the peak amplitude magnitude intersected the array of microphones 222. The map generator takes this data and the spacing distance D 230, and applying geometry, determines X-Y coordinates for each ridge data point. The coordinate data providing the location of ridges is stored.

In valley-depth data acquisition (e.g., FIGS. 8 and 9) the transmission synchronizer 1032 controls the frequency selectors 1034 to cycle through the frequencies used for depth measurement. The reception synchronizer collects the signal intensity data for the reflected diffuse ultrasound from the microphones, which is then stored. When all of the frequencies have been cycled through, the map generator 1046 processes the stored data to determine a peak amplitude magnitude for each microphone/coordinate, and creates a three-dimensional map of the valleys by converting the frequency/wavelength into a distance 832. The map generator 1046 then overlays the stored ridge data on the three-dimensional valley data to produce a three-dimensional map of the fingerprint.

If the fingerprint authentication module 1050 is being programmed, a template generator 1052 may take the three-dimensional map of the fingerprint, extract features, and store the extracted features as a template in storage 1058. Otherwise, a pattern recognition engine 1054 compares the map to the stored template and outputs a variance value. A decision threshold engine 1056 compares the variance value to a threshold value to determine whether to authenticate a user based on their fingerprint.

Figure 11:
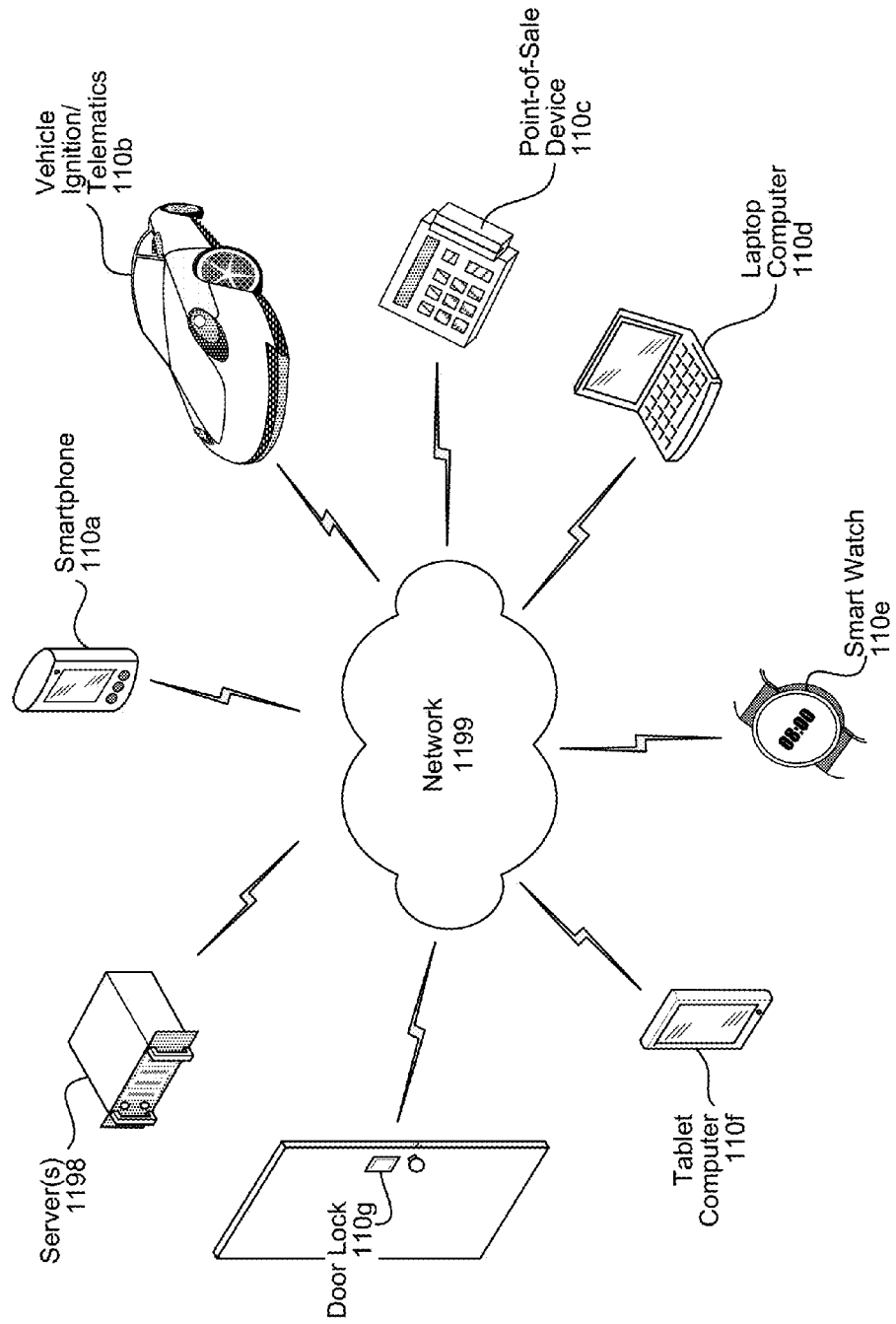
FIG. 11 illustrates an example of a computer network for use with devices including the ultrasonic fingerprint scanner.

FIG. 11 illustrates an example of a computer network for use with devices including the ultrasonic fingerprint scanner 112. Multiple devices 110 including a fingerprint scanner 112 may be employed in a single system 100. In such a multi-device system, each of the devices 110 may include different components for performing different aspects of the fingerprint mapping and authentication processes. The multiple devices may include overlapping components. The components of device 110 as illustrated in FIG. 10 are exemplary, and may be a stand-alone device or may be included, in whole or in part, as a component of a larger device or system.

As illustrated in FIG. 11, multiple devices, including fingerprint-reading device 110a-110g and server(s) 1198 may contain components of the system 100. The devices 110a-110g may be connected over a network 1199 to each other and to the server(s) 1198. The network 1199 may include a local or private network or may include a wide network such as the internet. Devices may be connected to the network 1199 through either wired or wireless connections.

In certain system configurations, one device may perform finger-print acquisition and another device may perform fingerprint authentication. For example, while a smartphone 110*a*, a vehicle ignition/telematics system 110*b*, a laptop computer 110*d*, a smart watch 110*e* (e.g., with the arrays 220/222 positioned behind the display), and a tablet computer 110*f* might perform both acquisition and authentication, a point-of-sale device 110*c* and a door lock 110*g* may rely on the server(s) 1198 to perform fingerprint authentication 1050.

Because fingerprint authentication may involve significant computational resources, in terms of both storage and processing power, such split configurations may be employed where the device 110 has lower processing capabilities than a remote device (i.e., server(s) 1198), and/or where there are a large number of stored templates to be used for authentication.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, beam forming, and live-scan fingerprint systems, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

In addition, as mentioned above, individual components of the fingerprint scanning module 1030 and the fingerprint authentication module 1050 may be implemented as firmware or as a state machine in hardware. For example, the transmission synchronizer 1032 and the reception synchronizer 1040 may be implemented as state machines on a field programmable gate arrays (FPGAs). The transmission beam formers 1036 may implemented as FPGAs or as application specific integrated circuits (ASICs). The decision threshold engine 1056 may be implemented as a digital comparator. The frequency selectors 1034 may be implemented as a matrix of solid state switches connected to oscillators generating the various ultrasonic frequencies. The spatial filter may be implemented as a specialized digital signal processor.

As used in this disclosure, the term "a" or "one" may include one or more items unless specifically stated otherwise. Further, the phrase "based on" is intended to mean "based at least in part on" unless specifically stated otherwise.

What is claimed is:

1. A method of generating a three-dimensional representation of a fingerprint using ultrasound, the method comprising:
    scanning, by a device, a first region of a fingertip with a first directed series of ultrasonic pulses to determine a first location in a first dimension and a second dimension of a first ridge of a plurality of ridges, the ultrasonic pulses of the first directed series having a first ultrasonic frequency;
    scanning, by the device, a second region of the fingertip with second directed series of ultrasonic pulses to determine a second location in the first dimension and the second dimension of a second ridge of the plurality of ridges, the ultrasonic pulses of the second directed series having a second ultrasonic frequency that is different from the first ultrasonic frequency, wherein the scanning of the first region overlaps in time with the scanning of the second region;
    emitting, by the device, diffuse ultrasound at a third ultrasonic frequency having a first wavelength toward the fingertip;
    determining, by the device, a third location in the first dimension and the second dimension where a first peak magnitude of first reflections occurs at a fourth ultrasonic frequency corresponding to a second wavelength, wherein the second wavelength is equal to the first wavelength or a harmonic of the first wavelength;
    determining that a first depth in a third dimension of a first valley at the third location is equal to the second wavelength;
    emitting, by the device, diffuse ultrasound at a fifth ultrasonic frequency having a third wavelength toward the fingertip;
    determining, by the device, a fourth location in the first dimension and the second dimension where a second peak magnitude of second reflections occurs at a sixth ultrasonic frequency corresponding to a fourth wavelength, wherein the fourth wavelength is equal to the third wavelength or a harmonic of the third wavelength; and
    determining that a second depth in the third dimension of a second valley at the fourth location is equal to the fourth wavelength;
    combining the first location of the first ridge and the second location of the second ridge to generate a two-dimensional representation of locations of the plurality of ridges of the fingerprint; and
    overlaying the two-dimensional representation of the locations of the plurality of ridges on the first depth of the first valley at the third location and the second depth of the second valley at the fourth location to generate the three-dimensional representation of the fingerprint.

2. The method of claim 1, wherein scanning the first region comprises:
    forming a first pulse of the first directed series of ultrasonic pulses by controlling phases and relative amplitudes of pulsed sound waves of the first ultrasonic frequency emitted from a first group of speakers of an array of speakers, to create a first pattern of constructive and destructive interference that combines to form the first pulse, the first pulse being directed towards the first region of the fingertip at a first transmission angle;
    acquiring first signal data from an array of microphones, the first signal data including third reflections of the first pulse, and fourth reflections of a second pulse of the second directed series of ultrasonic pulses;
    applying spatial filtering to the first signal data to determine a third peak magnitude of the third reflections and a first reception angle at which the third reflections produce the third peak magnitude relative to the array of microphones;

determining, based on the first signal data, first coordinates in the first dimension and the second dimension where the third reflections produce the third peak magnitude relative to the array of microphones; and determining the first location of the first ridge based on the first coordinates, the first reception angle, and a distance between the array of microphones and a surface of the device upon which the fingertip is placed for scanning.

3. The method of claim 2, further comprising:

forming a third pulse of the first directed series of ultrasonic pulses by controlling phases and relative amplitudes of pulsed sound waves of the first ultrasonic frequency emitted from a first group of speakers of an array of speakers, to create a second pattern of constructive and destructive interference that combines to form the third pulse, the third pulse being directed towards the first region of the fingertip at a second transmission angle, the second transmission angle being different than the first transmission angle;

acquiring second signal data from the array of microphones, the second signal data including fifth reflections of the third pulse, and sixth reflections of a fourth pulse of the second directed series of ultrasonic pulses;

applying spatial filtering to the second signal data to determine a fourth peak magnitude of the fifth reflections and a second reception angle at which the fifth reflections produce the second peak magnitude relative to the array of microphones;

determining, based on the second signal data, second coordinates in the first dimension and the second dimension where the third reflections the fourth peak magnitude relative to the array of microphones; and determining a fifth location of a third ridge of the plurality of ridges based on the second coordinates, the second reception angle, and the distance between the array of microphones and the surface.

4. The method of claim 1, further comprising:

generating each pulse of the first directed series of ultrasonic pulses that scans the first region using a first group of speakers of an array of speakers;

generating each pulse of the second directed series of ultrasonic pulses that scans the second region using a second group of speakers of the array of speakers;

scanning, by the device, a third region of the fingertip with a third directed series of ultrasonic pulses to determine a fifth location in the first dimension and the second dimension of a third ridge of the plurality of ridges, after scanning the first region, scanning the third region comprising generating each pulse of the third directed series of ultrasonic pulses at the first ultrasonic frequency using a third group of speakers of the array of speakers, wherein the third group contains at least one speaker not included in the first group; and scanning, by the device, a fourth region of the fingertip with fourth directed series of ultrasonic pulses to determine a sixth location in the first dimension and the second dimension of a fourth ridge of the plurality of ridges, after scanning the second region, scanning the fourth region comprising generating each pulse of the fourth directed series of ultrasonic pulses at the second ultrasonic frequency using a fourth group of speakers of the array of speakers, wherein the fourth group contains at least one speaker not included in the second group, wherein the scanning of the third region overlaps in time with the scanning of the fourth region.

5. A computing device comprising:

an array of microphones arranged in a first dimension and a second dimension;

an array of speakers interspersed among microphones of the array of microphones;

a processor;

a memory including instruction operable to be executed by the processor to perform a set of actions to configure the processor to:

scan regions of a fingertip using a first directed ultrasonic pulse emitted by a first group of speakers of the array of speakers and a second directed ultrasonic pulse emitted by a second group of speakers, to determine locations of ridges of the fingertip relative to the first dimension and the second dimension;

emit, from the array of speakers, first diffuse ultrasound having a first wavelength;

receive first signal data from the array of microphones, the first signal data including first reflections of the first diffuse ultrasound from the fingertip;

determine a first resonance location in the first dimension and the second dimension where the first diffuse ultrasound produces resonance based on a first peak magnitude of the first reflections included in first signal data;

determine a first depth of a first valley of the fingertip in a third dimension orthogonal to the first and second dimensions based on the first wavelength or a harmonic of the first wavelength, the first valley coinciding with the first resonance location;

emit, from the array of speakers, second diffuse ultrasound having a second wavelength;

receive second signal data from the array of microphones, the second signal data including second reflections of the second diffuse ultrasound from the fingertip;

determine a second resonance location in the first dimension and the second dimension where the second diffuse ultrasound produces resonance based on a second peak magnitude of second reflections included in the second signal data;

determine a second depth of a second valley of the fingertip in the third dimension orthogonal to the first and second dimensions based on the second wavelength or a harmonic of the second wavelength, the second valley coinciding with the second resonance location; and generate a three-dimensional representation of a fingerprint of the fingertip including the locations of the ridges, the first depth of the first valley, and the second depth of the second valley.

6. The computing device of claim 5, wherein the first directed ultrasonic pulse is at a first frequency, the second directed ultrasonic pulse is at a second frequency that is different than the first frequency, emission of the first directed ultrasonic pulse overlaps in time with emission of the second directed ultrasonic pulse, and the instructions to scan regions further configure the processor to:

emit, using a third group of speakers, a third directed ultrasonic at the first frequency towards a third region; and emit, using fourth group of speakers a fourth directed ultrasonic pulse at the second frequency towards a fourth region, emission of the third directed ultrasonic pulse overlapping in time with emission of the fourth directed ultrasonic pulse.

7. The computing device of claim 5, wherein the instructions to scan regions further configure the processor to:
receive third signal data from the array of microphones, the third signal data including third reflections of the first directed ultrasonic pulse;
apply spatial filtering to the third signal data to determine a third peak magnitude and a first direction of the third reflections;
determine first coordinates in the first dimension and the second dimension where the third reflections result in the third peak magnitude relative to the array of microphones; and
determine a first location of a first ridge of the fingertip relative to the first dimension and the second dimension based on the first coordinates and the first direction.

8. The computing device of claim 7, wherein:
the first directed ultrasonic pulse is at a first frequency,
the second directed ultrasonic pulse is at a second frequency that is different than the first frequency,
the third signal data further includes fourth reflections of the second directed ultrasonic pulse, and
the instructions to scan regions further configure the processor to:
apply spatial filtering to the third signal data to determine a fourth peak magnitude and a second direction of the fourth reflections;
determine second coordinates in the first dimension and the second dimension where the fourth reflections result in the fourth peak magnitude relative to the array of microphones; and
determine a second location of a second ridge of the fingertip relative to the first dimension and the second dimension based on the second coordinates and the second direction.

9. The computing device of claim 7, wherein the instructions to scan using the first directed ultrasonic pulse emitted by the first group of speakers further configure the processor to:
control phases and relative amplitudes of sound waves emitted by the first group of speakers to create a pattern of constructive and destructive interference that forms the first directed ultrasonic pulse.

10. The computing device of claim 5, wherein the instructions to scan regions configure the processor to:
direct, from the first group of speakers of the array of speakers, the first directed ultrasonic pulse in a first direction;
receive third signal data from the array of microphones, the third signal data including third reflections of the first directed ultrasonic pulse from the fingertip;
apply spatial filtering to the third signal data to determine a third peak magnitude of the third reflections and a first reception direction at which the third reflections producing the third peak magnitude are incident on the array of microphones;
determine first coordinates in the first dimension and the second dimension where the third reflections producing the third peak magnitude are incident on the array of microphones; and
determine a first location of a first ridge of the fingertip relative to the first dimension and the second dimension based on the first coordinates and the first reception direction.

11. The computing device of claim 5, wherein:
the first directed ultrasonic pulse is at a first frequency,
the second directed ultrasonic pulse is at a second frequency,
emission of the first directed ultrasonic pulse overlaps in time with emission of the second directed ultrasonic pulse, and
the instructions to further configure the processor to:
select the first frequency and the second frequency so that the first frequency does not correspond to any harmonic of the second frequency and the second frequency does not correspond to any harmonic of the first frequency, the first frequency and the second frequency being different.

12. The computing device of claim 5, wherein the instructions further configure the processor to:
compare the three-dimensional representation of the fingerprint to a stored fingerprint template;
determine that a score representing how closely the three-dimensional representation matches the stored template exceeds a threshold value; and
authenticate access to a service in response to the score exceeding the threshold value.

13. A non-transitory computer-readable storage medium storing processor-executable instructions for controlling a computing device, comprising program code to configure the computing device to:
scan regions of a fingertip using a first directed ultrasonic pulse emitted by a first group of speakers of an array of speakers and a second directed ultrasonic pulse emitted by a second group of speakers, to determine locations of ridges of the fingertip relative to the first dimension and the second dimension;
emit, from the array of speakers, first diffuse ultrasound having a first wavelength;
receive first signal data from an array of microphones, the first signal data including first reflections of the first diffuse ultrasound from the fingertip;
determine a first resonance location in the first dimension and the second dimension where the first diffuse ultrasound produces resonance based on a first peak magnitude of the first reflections included in first signal data;
determine a first depth of a first valley of the fingertip in a third dimension orthogonal to the first and second dimensions based on the first wavelength or a harmonic of the first wavelength, the first valley coinciding with the first resonance location;
emit, from the array of speakers, second diffuse ultrasound having a second wavelength;
receive second signal data from the array of microphones, the second signal data including second reflections of the second diffuse ultrasound from the fingertip;
determine a second resonance location in the first dimension and the second dimension where the second diffuse ultrasound produces resonance based on a second peak magnitude of second reflections included in the second signal data;
determine a second depth of a second valley of the fingertip in the third dimension orthogonal to the first and second dimensions based on the second wavelength or a harmonic of the second wavelength, the second valley coinciding with the second resonance location; and
generate a three-dimensional representation of a fingerprint of the fingertip including the locations of the ridges, the first depth of the first valley, and the second depth of the second valley.

14. The non-transitory computer-readable storage medium of claim 13, wherein
the first directed ultrasonic pulse is at a first frequency,
the second directed ultrasonic pulse is at a second frequency that is different than the first frequency,
emission of the first directed ultrasonic pulse is to overlap in time with emission of the second directed ultrasonic pulse, and
the program code to scan regions is to further configure the computing device to:
emit, using a third group of speakers, a third directed ultrasonic at the first frequency towards a third region; and
emit, using fourth group of speakers a fourth directed ultrasonic pulse at the second frequency towards a fourth region, emission of the third directed ultrasonic pulse to overlap in time with emission of the fourth directed ultrasonic pulse.

15. The non-transitory computer-readable storage medium of claim 13, wherein the program code to scan regions is to further configure the computing device to:
receive third signal data from the array of microphones, the third signal data including third reflections of the first directed ultrasonic pulse;
apply spatial filtering to the third signal data to determine a third peak magnitude and a first direction of the third reflections;
determine first coordinates in the first dimension and the second dimension where the third reflections result in the third peak magnitude relative to the array of microphones; and
determine a first location of a first ridge of the fingertip relative to the first dimension and the second dimension based on the first coordinates and the first direction.

16. The non-transitory computer-readable storage medium of claim 15, wherein:
the first directed ultrasonic pulse is at a first frequency,
the second directed ultrasonic pulse is at a second frequency that is different than the first frequency,
the third signal data further includes fourth reflections of the second directed ultrasonic pulse, and
the program code to scan regions is to further configure the computing device to:
apply spatial filtering to the third signal data to determine a fourth peak magnitude and a second direction of the fourth reflections;
determine second coordinates in the first dimension and the second dimension where the fourth reflections result in the fourth peak magnitude relative to the array of microphones; and
determine a second location of a second ridge of the fingertip relative to the first dimension and the second dimension based on the second coordinates and the second direction.

17. The non-transitory computer-readable storage medium of claim 15, wherein the program code to using the first directed ultrasonic pulse emitted by the first group of speakers is to further configure the computing device to:
control phases and relative amplitudes of sound waves emitted by the first group of speakers to create a pattern of constructive and destructive interference that forms the first directed ultrasonic pulse.

18. The non-transitory computer-readable storage medium of claim 13, wherein the program code to scan regions is to further configure the computing device to:
direct, from the first group of speakers of the array of speakers, the first directed ultrasonic pulse in a first direction;
receive third signal data from the array of microphones, the third signal data including third reflections of the first directed ultrasonic pulse from the fingertip;
apply spatial filtering to the third signal data to determine a third peak magnitude of the third reflections and a first reception direction at which the third reflections producing the third peak magnitude are incident on the array of microphones;
determine first coordinates in the first dimension and the second dimension where the third reflections producing the third peak magnitude are incident on the array of microphones; and
determine a first location of a first ridge of the fingertip relative to the first dimension and the second dimension based on the first coordinates and the first reception direction.

19. The non-transitory computer-readable storage medium of claim 13, wherein:
the first directed ultrasonic pulse is at a first frequency,
the second directed ultrasonic pulse is at a second frequency,
emission of the first directed ultrasonic pulse is to overlap in time with emission of the second directed ultrasonic pulse, and
the program code is to further configure the computing device to:
select the first frequency and the second frequency so that the first frequency does not correspond to any harmonic of the second frequency and the second frequency does not correspond to any harmonic of the first frequency, the first frequency and the second frequency being different.

20. The non-transitory computer-readable storage medium of claim 13, wherein the program code is to further configure the computing device to:
compare the three-dimensional representation of the fingerprint to a stored fingerprint template;
determine that a score representing how closely the three-dimensional representation matches the stored template exceeds a threshold value; and
authenticate access to a service in response to the score exceeding the threshold value.

\* \* \* \* \*